3,480,448
PURE CULTURE FERMENTATION OF
GREEN OLIVES
John L. Etchells and Thomas A. Bell, Raleigh, N.C., and Ivan D. Kittel, Shakopee, Minn., assignors to the United States of America as represented by the Secretary of Agriculture
Filed Oct. 10, 1966, Ser. No. 586,323
Int. Cl. A23b 7/00
U.S. Cl. 99—156        6 Claims

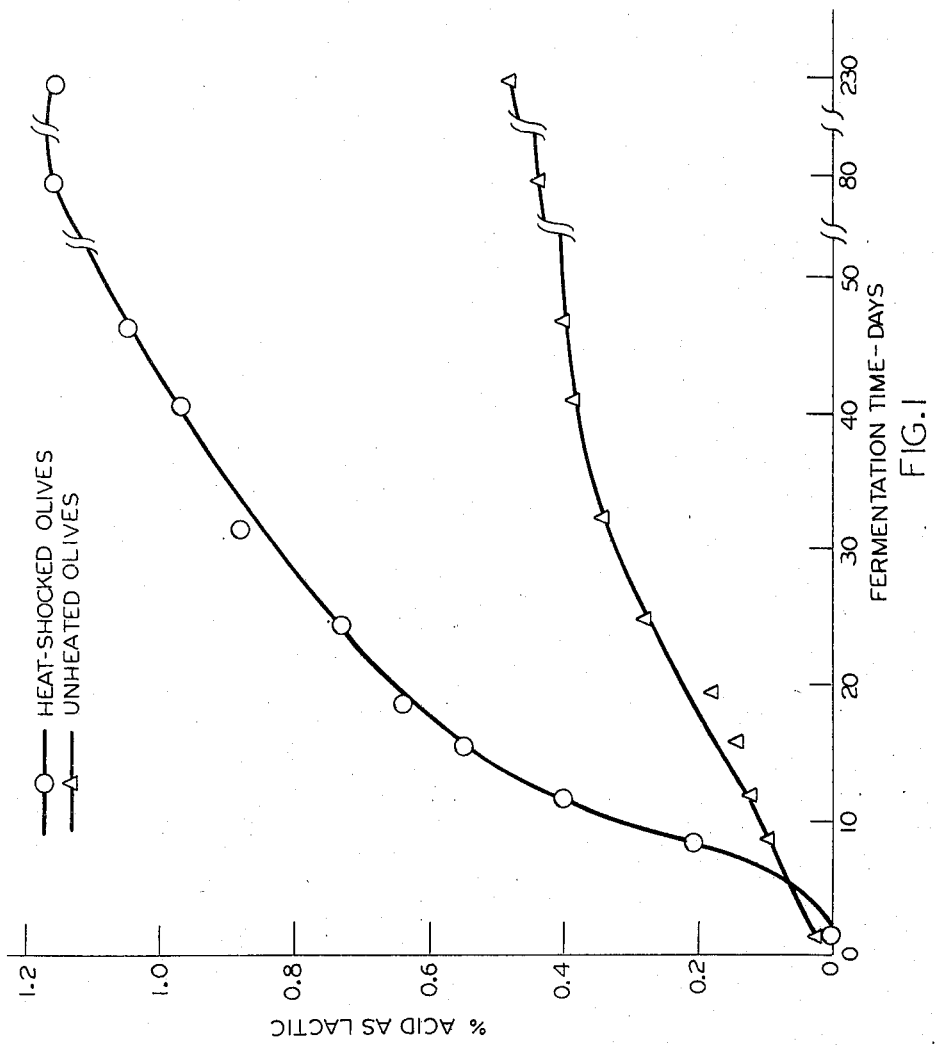

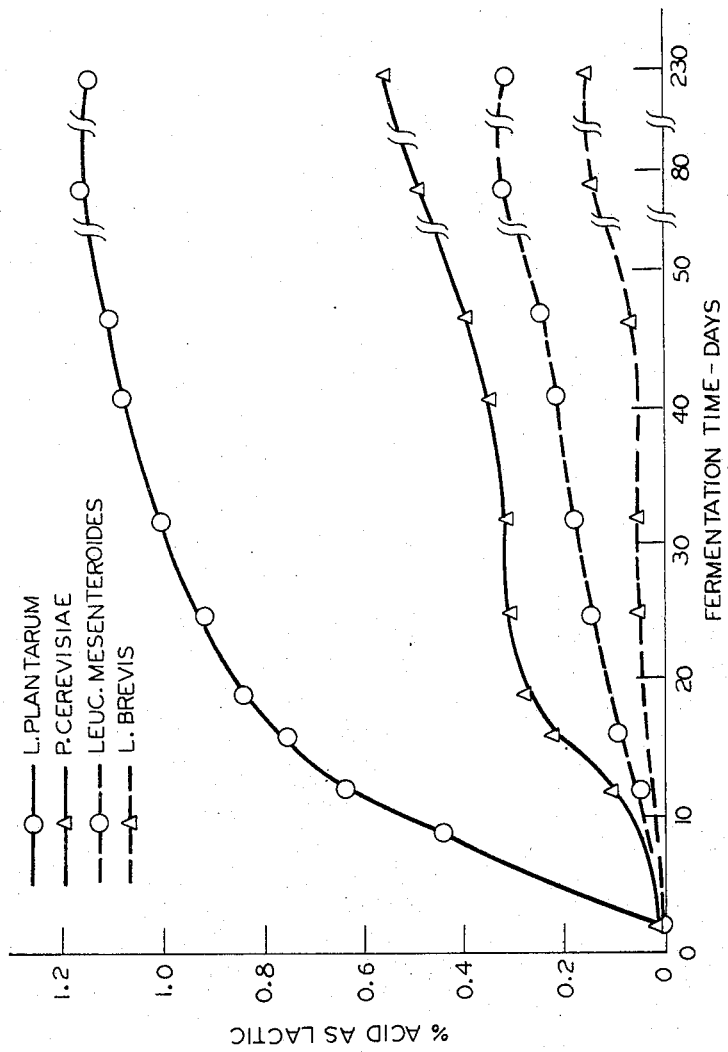

ABSTRACT OF THE DISCLOSURE

An improved brine-curing process for olives comprising fermentation controlled by selected microorganisms is provided. Introduction and growth of competing microorganisms is inhibited by the employment of aseptic processing conditions and by the use of a heat-shocking operation. The heat-shocking operation is performed on the olives after lye treatment for debittering but before introduction of the selected microorganisms.

---

Figure 3A:
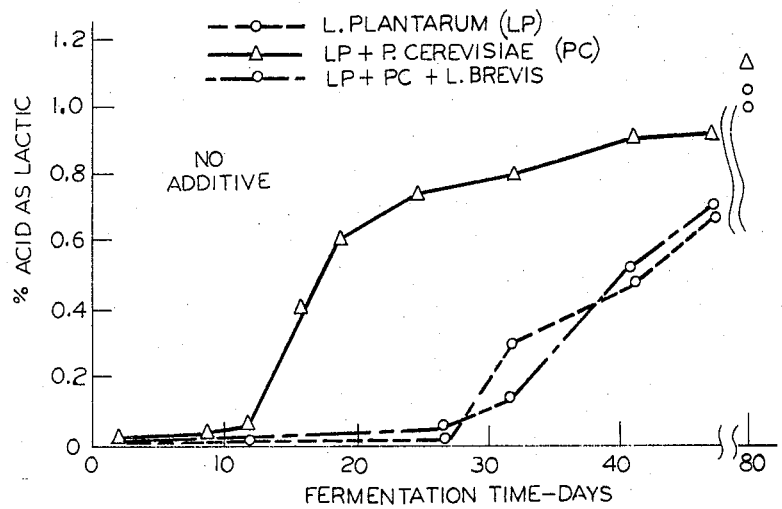

A non-exclusive, irrevocable, royalty-free license in the invention herein described, throughout the world for all purposes of the United States Government, with the power to grant sublicenses for such purposes, is hereby granted to the Government of the United States of America.

This invention relates to an improved method for pickling green olives and to the product so produced. Specifically, it deals with a process for the pure-culture fermentation of green olives by selected pure cultures of non-gas producing lactic acid bacteria. More specifically, it deals with the use of such cultures in the pickling process without accompanying nutrient additives. Still more specifically, the process greatly enhances the fermentability of the olives by the pure culture inoculant. The resultant pickled fruit is not physically or chemically damaged, and has excellent commercial acceptability.

The term "fruit" as used herein includes commercial varieties of green olives such as Manzanillo, Barouni, Sevillano, Ascolano, and Mission. Because of the unusual problems of pickling (fermenting) the Manzanillo variety, the term "Manzanillo" will frequently be used below as "the fruit." However, the invention is not to be construed as limited to the Manzanillo variety.

The term "nutritive additives" relates to fermentable carbohydrates, particularly dextrose (corn sugar).

The conventional process for the brine curing of green olives for commercial use involves first sorting to remove trash, leaves, and defective fruit followed by a lye treatment to destroy most of the bitter factor (oleuropein) with subsequent leaching with water to remove the lye. The debittered fruit is then barreled and covered with a brine consisting of a sodium chloride (salt) solution of about 25° to 40° salometer. Subsequent fermentation is induced by micro-oranisms normally extant on the fruit and transient micro-organisms introduced during and/by virtue of process operations. This limits the type and number of micro-organisms present in the brine only by the ability of each to survive the conditions of lye treatment and of brining. The success of this natural, mixed microbial flora fermentation process depends completely upon chance and the skills of those practicing the art of brine curing in establishing environmental conditions favorable for the growth of the lactic acid producing bacteria. A major and costly difficulty in the natural fermentation process is the frequent ascendancy of nonlactic acid producing bacteria, yeasts, molds and other fungi. This ascendancy results in a fermentation which is abnormal to the one desired, and usually gives rise to such kinds of deteriorative conditions as softening, gassy deterioration, butyric acid fermentation, putrefaction, and the other unpalatable and unappetizing changes.

W. V. Cruess was the first to suggest the possible use of pure cultures of lactic acid bacteria for starters in the fermentation of green olives. *Lactobacillus pentosus* (syn. *L. plantarum*) was considered to be worthy of commercial brining tests (Use of Starters for Green Olive Fermentations, Fruit Products Journal 17, (1) 12. 1937). Subsequently, Vaughn, Douglas, and Gililland (Production of Spanish-type Green Olives, California Agricultural Experiment Station Bulletin No. 678. 1943) greatly expanded the pioneering studies of Professor Cruess and inquired further into the matter of pure culture starters for olive brines. Using one species of the genus *Lactobacillus*, namely *L. plantarum* (the same strain which W. V. Cruess had used) Vaughn et al. fermented debittered (lye treated) green olives of the Sevillano variety but were unable to get satisfactory fermentation results by similar means for Manzanillo fruit with simultaneous lactic acid formation using *L. plantarium* starters. As a result, they stated "It is readily seen that inoculation alone had little effect on acceleration of acid production. However, when corn sugar was made available, acid production increases significantly. *This is further proof that inoculation alone is frequently not sufficient to accelerate acid production.*" They also concluded that, "None of the strains of *L. plantarum* differed significantly in their effect on the acceleration of the fermentation, nor was it possible to detect appreciable differences in quality of the olives pickled in brines which had been inoculated with the different cultures." Thus, it is seen that there is a need for a process for the pure-culture fermentation of green olives, particularly Manzanillo variety, without the addition of nutrient additives such as fermentable carbohydrates in the *starting* material.

The process should be simple and easily carried out; it should be applicable to the commercial varieties of green olive fruit; it should result in the production of lactic acid rapidly in equalized salt brines ranging about from 15° to 25° salometer (4.0 to 6.6 weight percent); the final acidity of the completely fermented olive brines should range about from 0.6 to 1.2 percent calculated as lactic acid on a weight/volume basis, i.e., gm. lactic acid in 100 ml. brine and referred to herein as w./v. basis or (w./v.) and should have brine pH's of about 3.8 to 4.1. Most important, the fermented fruit treated by the process should have good texture, color, flavor, and freedom from such defects as gassy deterioration, softening, and butyric acid fermentation which would make the fruit commercially unacceptable.

Herein is reported the invention of a new, novel, and practical process for the brine fermentation and curing of olives such Manzanillo variety which enables scientific control of the fermentation thereby decreasing the chances of brine-stock loss and giving rise to finished olive products of unusually high quality and controlled characteristics.

It is accordingly an object of this invention to provide a brine-curing process for olives in which the frequency of abnormal fermentations is reduced or eliminated by the attenuation, destruction, or removal of the naturally occurring mixed flora on the fruit and transient microorganisms introduced during and/or by virtue of processing operation which give rise to abnormal fermentations. These undesirable microbial species are supplanted with a pure-culture or cultures of one or more bacterial species or strains selected from the genera Lactobacillus and Pediococcus.

Another object of this invention is to provide an olive brine curing process in which the desirable characteristics of the processed product may be predicted. This is accomplished by knowing the biochemical properties and fermentative behavior of a selected strain or a mixture of selected strains of nongas producing lactic acid bacteria employed in the pure culture process. Our selection studies first revealed that specific fermentation differences affecting brine-stock fruit quality were obtained between individual species of lactic acid bacteria. For example, a decided difference in the color of brine cured olives was obtained with different species of lactic acid bacteria.

By virtue of these screening tests, final selection of the most desirable strains of lactic acid bacterial species for use in olive fermentations was accomplished. Criteria used in the selection of a given strain included: color, odor, flavor, and texture of the fermented olives; utilization of brine sugars; rate of development of brine acidity; final brine acidity and pH; salt and acid tolerance of the culture; temperature range and tolerance of the culture; and vigor, viability, longevity, and regeneration power of the preserved culture(s). The two cultures selected in their order of desirability were:

*Lactobacillus plantarum,*
*Pediococcus cerevisiae*

A still further object of this invention is to provide a novel process for manufacturing pickled green olives in institutional type containers as well as in bulk for reprocessing as retail olive products.

The new process as applied to the manufacture of pure-culture pickled green olives, such as Manzanillo variety involves:

(1) Harvesting, sizing, sorting, and washing the green olives.

(2) Removing most of their bitterness. This treatment comprises soaking the fruit in a previously cooled (60° to 70° F.) 1.25 to 2.0 percent lye solution, (w./v. basis) until the lye had penetrated about ⅔ to ¾ of the way to the pit of the olives.

The length of time of the lye treatment will depend upon the temperature and strength of the lye solution, and the variety, size and maturity of the olive fruit. These conditions are well known to those skilled in the art. The lye solution is then quickly poured off, the olives rinsed twice with cool water after which the olives are leached in two changes of cool water for a length of time sufficient to remove the alkali (lye). At this stage, the olives we processed as described above were of excellent texture and color and were free from such defects as softening, blistering and graying that might result from improper lye treatment and subsequent washing.

(3) The debittered olives were divided into two equal lots and one lot subjected to a heat-shock treatment by immersion for 3 to 5 minutes in hot water maintained at 165° to 175° F. This was accomplished by placing 7- to 8-lb. lots of olives in a deep-fry basket fitted with a hardware cloth top and immersing them in about 50 gallons of water kept at the desired temperature in a steam-jacketed kettle. To insure even heating of the olives, the basket was kept in constant motion during the exposure time and the water was circulated. This treatment was designed as a means of controlling competitive microorganisms occurring naturally on the olives. The remaining lot of olives was used in preparing the unheated controls.

For commercial packers, the debittered, washed and bleached green olives may be subjected to a heat-shocking operation in a continuous process. Here the fruit must be completely immersed in hot water while passing through a suitably modified continuous vegetable blancher. Excellent results are obtained in 3 to 5 minutes at 165° to 175° F.

The heat-shocking treatment is highly effective in reducing the numbers of vegetative micro-organisms, particularly the asporogenous species normally found on the debittered olives in sufficient numbers to be considered as interfering and competitive contaminants in the pure culture fermentation process. Also, the heat-shocking treatment inactivates or attenuates certain deleterious enzyme systems associated with green olives which, if present in sufficient concentrations, could otherwise cause deterioration of the texture, color, flavor, and odor of the fermented product. The heat-shock treatment not only proved effective in ridding the fruit of naturally occurring, interfering and competitive microbial groups prior to brining and inoculation, but also made the olives highly fermentable with respect to the growth of, and acid production by, the introduced culture, particularly *L. plantarum*. This was unexpected. Of the four species used as inocula, *L. Plantarum* was by far the most vigorous in fermentation ability. Heat-shocking in hot water at 165° to 175° F. does not preclude the employment of other means of effecting surface destruction, attenuation, or removal of micro-organisms such as heat-shocking in steam, irradiation, detergents, and bactericidal washes such as peracetic acid, and the like.

(4) Draining and packing the heat-shocked olives in sanitized containers. The term "sanitized" is employed as being descriptive of a container and its closure that have received conventional washing and then rinsing with a chlorine solution of sufficient strength to destroy the asporogenous microbes, plus the normal careful handling that is exercised in the care of food containers intended for human use.

(5) Covering the packed green olive fruit with a concentration of salt (sodium chloride) brine which will equalize with the olives to approximately 4.0 to 6.5 weight percent and which brine has been previously heated to 175° to 180° F., and then cooled to such a temperature level (about 40° to 45° F.) that the total pack (i.e., hot, heat-shocked olives plus brine and container) will equalize out within the desired temperature range (92° to 93° F.) for growth for the particular lactic acid organism chosen for the fermentation. A holding period of about 12 to 24 hours at room temperature, prior to inoculation, is a good practice; this permits partial equilibration of the brine-olive mixture to a range well within that needed for good growth of the introduced culture(s).

(6) Adding an inoculum of selected pure culture lactic acid producing bacteria in the form of "quick frozen" (in liquid nitrogen as wet cells) or "freeze-dried" pellets, granules, or powder; or, cells cultivated in a suitable nutrient broth and used as such. The amount of inoculum should be about 1,000,000,000 viable cells per quart of packed and brined olives. These culture preparation processes are well known in the science of pure culture production.

It is advantageous to add a sufficient quantity of a food-grade, edible organic acid such as lactic or acetic acid, or mixtures thereof, to the container prior to the addition of the inoculum. This addition of acid serves a twofold purpose: first, it reduces the pH of the equalized brine pH to within the range of 5.0 to 5.5, a range which favors the early onset of fermentation (good activity) of the introduced lactic acid producing bacteria; second, it greatly retards or inhibits the possible development of heat-resistant bacterial spores that may survive the debittering and heat-shocking treatments.

It is also within the scope of our invention to add the edible organic acid (preferably lactic) to the cover brine prior to addition to the olives.

(7) Sealing the container and incubating it at ambient room temperature, or preferably at the temperature which is optimum for the lactic acid producing bacterial species selected (ca. 92° F.). The growth of the pure culture organism progresses very rapidly as shown in FIGURE 1.

EXAMPLE 1

Effect of heat-shocking olives on development of brine acid

The following example shows the effect of heat-shocking Manzanillo olives on their subsequent acid fermentation by *Lactobacillus plantarum*. For heat-shocked lots, the lye treated and washed olives were prepared for fermentation by immersion in hot water (165° F. for 3 min.) and, after packing into sanitized containers, were covered with a previously pasteurized and cooled 10.6% salt brine which equalized at 4.8 to 5.9%. Inoculation with the deside culture followed a 12- to 24-hr. brine equilibrating period at which time the salt concentration was reduced to about 6.0%; incubation was at 75° to 80° F. for 72 hours and then at 68° to 75° F. For unheated olives, the same general procedure was used except aseptic conditions were not employed in packing and handling procedures. The results are plotted in FIGURE 1.

The marked increase in both the amount and the rate of acid production in the brines of heated as compared with unheated olives is clearly evident. Microscopical examination of those brines showed high populations of bacteria whose cellular morphology was typical of the *L. plantarum* culture used. In the unheated control, the rate of acid development was very slow and after 7½ months of fermentation and storage the brine acidity was less than half the amount produced with heat-shocked olives. The microscopical examination of the unheated, control brines showed conclusively that *L. plantarum* did not become established to any appreciable degree. Rather, pediococci, yeasts, ovoid cells usually in short chains and miscellaneous shaped rods, in the order named, were the principal morphological cell types present.

Generally, similar results were obtained with Ascolano, Barouni, and Sevillano varieties.

EXAMPLE 2

Fermentation activity of heat-shocked olives induced by various species of lactic acid bacteria In this example, using the general procedure of Example 1 for heat-shocked olives, several species of lactic acid bacteria are evaluated for fermentation purposes. The results are shown in FIGURE 2.

It will be observed that *L. plantarum* was by far the most vigorous in fermentation activity as judged by the rate and amount of developed acidity. (FIGURE 2). This species consistently established itself in heat-shocked brined olives and produced final acidities between 1.0 and 1.2% with brine pH's of 3.8 to 3.9. *P. cerevisiae* was the next most active species, yet the maximal acidity developed was about one-half that resulting from fermentations by *L. plantarum*. *Leuc. mesenteroides* and *L. brevis*, in that order, followed *P. cerevisiae* as to fermentation activity in the olive brines. *L. brevis* was almost wholly inactive, showing very little acid production or brine turbidity.

EXAMPLE 3

The following example serves to illustrate the striking influence on fermentation behavior of heat-shocked (165° F. for 3 minutes) Manzanillo olives by the addition of different levels of lactic acid. The lactic acid was added to the heat-shocked olives after they were packed and covered with curing brine but 12–24 hrs. prior to inoculation with *L. plantarum*. The three acidity levels were:

For heat-shocked olives (a) nonacidified
(b) plus 5 ml. 85% lactic acid/gal. jar
(c) plus 10 ml. 85% lactic acid/gal. jar For unheated, natural controls, uninoculated (d) nonacidified
(e) plus 5 ml. 85% lactic acid/gal. jar
(f) plus 10 ml. 85% lactic acid/gal. jar The brining procedure of Example 1 was followed.

The data shown in Table I are an average of triplicate experiments for each value shown.

TABLE I.—EFFECT OF ACIDIFICATION ON THE FERMENTATION OF BRINED OLIVES

Heat-Shocked Olives (165° F., 3 min.), Inoculated with *L. plantarum*

(a) Nonacidified

| Analysis of Brine Samples | Time in Days | | | | |
|---|---|---|---|---|---|
| | 4 | 11 | 19 | 30 | Final * |
| Acidity as lactic acid (percent) | 0.0 | 0.0 | 0.0 | 0.06 | 0.56 |
| Brine pH | 8.7 | 7.8 | 7.6 | 7.3 | 4.2 |
| Salt content (percent) | 6.1 | | | 5.8 | 5.5 |

Quality Rating at 7½ Months: Overall acceptability: Acceptable.
Microscopical Examination: Only cells typical of *L. plantarum* observed after 30 and 225 days of fermentation and storage.

(b) Acidified with 5 ml. of lactic acid

| Analysis of Brine Samples | Time in Days | | | | |
|---|---|---|---|---|---|
| | 4 | 11 | 19 | 30 | Final * |
| Acidity as lactic acid (percent) | 0.04 | 0.0 | 0.10 | 0.35 | 0.59 |
| Brine pH | 7.4 | 7.1 | 6.8 | 4.7 | 4.1 |
| Salt content (percent) | 5.8 | | | 5.7 | 5.7 |

Quality Rating at 7½ Months: Overall acceptability: Acceptable.
Microscopical Examination: Only cells typical of *L. plantarum* observed after 30 and 225 days of fermentation and storage.

(c) Acidified with 10 ml. of lactic acid

| Analysis of Brine Samples | Time in Days | | | | |
|---|---|---|---|---|---|
| | 4 | 11 | 19 | 30 | Final * |
| Acidity as lactic acid (percent) | 0.10 | 0.25 | 0.52 | 0.57 | 0.63 |
| Brine pH | 5.0 | 5.1 | 4.2 | 4.1 | 4.0 |
| Salt content (percent) | 5.8 | | | 5.8 | 5.8 |

Quality Rating at 7½ Months: Overall acceptability: Acceptable.
Miscroscopical Examination: Only cells typical of *L. plantarum* observe after 30 and 225 days of fermentation and storage.

Natural Controls, Unheated, Uninoculated (d) Non-acidified

| Analysis of Brine Samples | Time in Days | | | | |
|---|---|---|---|---|---|
| | 4 | 11 | 19 | 30 | Final * |
| Acidity as lactic acid (percent) | 0.04 | 0.15 | 0.19 | 0.22 | 0.23 |
| Brine pH | 7.7 | 5.5 | 5.3 | 5.2 | 5.2 |
| Salt content (percent) | 5.7 | | | 5.6 | 5.6 |

Quality Rating at 7½ Months: Overall acceptability: Not acceptable.
Microscopical Examination: After 30 and 225 days, chiefly short, fat, rod shaped cells and slender rods observed; a few cells typical of *L plantarum* noted.

(e) Acidified with 5 ml. of lactic acid

| Analysis of Brine Samples | Time in Days | | | | |
|---|---|---|---|---|---|
| | 4 | 11 | 19 | 30 | Final * |
| Acidity as lactic acid (percent) | 0.04 | 0.0 | 0.0 | 0.11 | 0.18 |
| Brine pH | 7.6 | 7.2 | 7.0 | 6.1 | 5.8 |
| Salt content (percent) | 5.7 | | | 6.0 | 6.0 |

Quality Rating at 7½ Months: Overall acceptability: Not acceptable.
Microscopical Examination: After 30 and 255 days, chiefly small oval cells and yeasts observed; no *L. plantarum* cell types noted.

(f) Acidified with 10 ml. of lactic acid

| Analysis of Brine Samples | Time in Days | | | | |
|---|---|---|---|---|---|
| | 4 | 11 | 19 | 30 | Final * |
| Acidity as lactic acid (percent) | 0.06 | 0.12 | 0.11 | 0.14 | 0.17 |
| Brine pH | 6.2 | 6.1 | 6.0 | 5.8 | 5.7 |
| Salt cont (percent) | 5.8 | | | 6.0 | 6.0 |

Quality Rating at 7½ Months: Overall acceptability: Not acceptable.
Microscopical Examination: After 30 and 225 days, only yeast cells observed.

* At end of fermentation period.

It will be observed (Table I) that modification of the brine by the addition of lactic acid led to an early onset (start) of the acid fermentation of the heat-shocked, brined olives inoculated with *L. plantarum*. It will also be observed that the *natural controls* fermented rather poorly and slowly, regardless of acidification treatment and produced less than half the amount of total acid than did heat-shocked olives.

When the above experiment is repeated except the heat-shocking treatment is carried out at 175° F. for 3 minutes, the fermentation results are essentially the same.

EXAMPLE 4

Figure 3B:
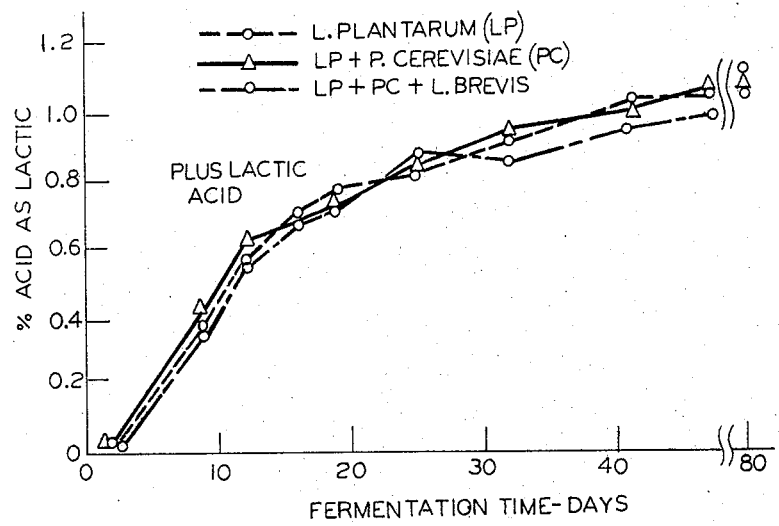
Figure 3C:
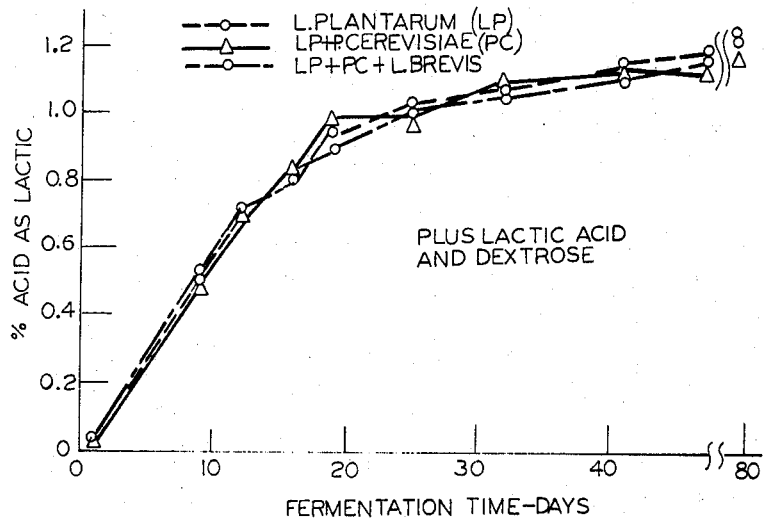
Figure 3D:
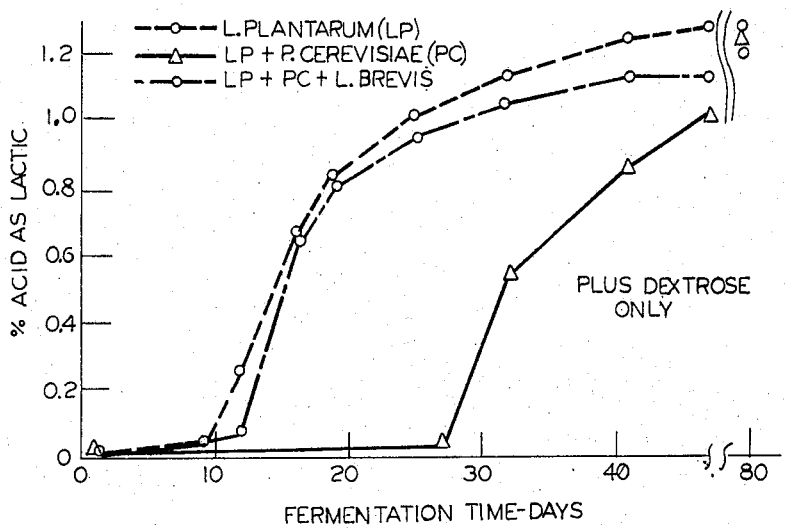

Effect on onset of fermentation resulting from various additives and inoculants to heat-shocked Manzanillo olives As a further example, *L. plantarum* was mixed with an equal amount of *P. cerevisiae* and with equal amounts of *P. cerevisiae* and *L. brevis* and used as inocula for heat-shocked Manzanillo green olives prepared by the process of Example 1. The following treatments were employed prior to brining and inoculation:

(A) Brine only, no additive(s).
(B) Brine, plus 5 ml. 85% lactic acid/gal. brined olives.
(C) Brine, plus 1.5 weight percent dextrose plus 5 ml. 85% lactic acid/gal. brined olives.
(D) Brine, plus 1.5 weight percent dextrose only/gal. brined olives. The results are shown in FIGURES 3A, 3B, 3C, and 3D.

It will be observed that modification of the curing brines by the addition of lactic acid, either alone or with dextrose, led to an early onset of the fermentation of heat-shocked brined olives. However, in the two non-acidified treatments (A and D), individual fermentations were highly variable as to the onset of acid development. In contrast, the lactic acid treated lots (B and C) initiated early acid development and showed brine acidity values during fermentation that appear to be almost identical; in fact, when curves are plotted using the data from each of the two treatments the curves are almost superimposed. These results also serve to emphasize that *L. plantarum* becomes the dominant species when the inoculum consists of a mixture of this organism with *P. cerevisiae* or, with *P. cerevisiae* and *L. brevis* in equal numbers. This is clearly evident from the data for acidified treatments (B and C). Microscopical examination of these brines during active fermentation revealed a large predominance of cells typical of the *L. plantarum* culture used as compared with the organisms added with it. In fact, in most instances the latter cell types could not be found.

We claim:

1. A process for fermenting clean, sorted, and graded green olive fruit in brine comprising:
    (a) debittering the green olive fruit by soaking it in sodium hydroxide solution which is at a temperature of about from 60° F. to 70° F. and of a strength varying about from 1.25 to 2.0 weight percent, said combination of sodium hydroxide and olives being maintained at about ambient room temperature until the sodium hydroxide has penetrated about from ⅔ to ¾ of the way to the pit of the fruit,
    (b) separating the sodium hydroxide solution from the fruit followed by washing and leaching the fruit in cool water to remove the sodium hydroxide,
    (c) heat-shocking the washed olives by complete immersion in hot water maintained at about from 165° to 175° F. for about from 3 to 5 minutes to reduce the numbers of contaminating vegetable micro-organisms, and to inactivate or attenuate deleterious enzyme systems that might cause deterioration of the texture, color, flavor, and odor in the ultimately fermented product,
    (d) draining and packing the heat-shocked olives in a "sanitized" container together with a brine which has been previously heated to about from 175° F. to 180° F. and subsequently cooled to about from 40° F. to about 45° F. so that the total pack consisting of the hot, heat-shocked olives, the brine, and the container, will equalize out within the temperature range of about from 92° F. to 93° F. desired for growth of the particular lactic acid organism to be chosen for the subsequent fermentation, said brine being of a strength to give a final equilibrium concentration of salt within the range of about from 4.0 to 6.5 weight percent,
    (e) adding to the container a sufficient quantity of a food-grade, edible organic acid to reduce the pH of the equalized brine to about from 5.0 to 5.5 thereby to accelerate the early onset of the fermentation of the olives, and, simultaneously, to inhibit the growth of spore-forms that survive the debittering, washing, leaching and heat-shocking treatments,
    (f) allowing the brined and acidified olives to stand for about from 12 to 24 hours at ambient room temperature to reduce the salt concentration to well within the range for good growth of the cultures to be used for inoculation,
    (g) inoculating the container of the debittered, heat-shocked, packed, brined, acidified, and cooled olives with the pure culture lactic acid fermentation-inducing micro-organism *Lactobacillus plantarum*, said micro-organism being introduced in a quantity the order of magnitude of which is about 1,000,000,000 viable cells per quart of packed and brined olives.
    (h) sealing and incubating the container of olives at a temperature favorable for the growth of the introduced pure culture micro-organism until the fermentation has progressed to completion, as indicated by abatement of micro-organism growth and development of brine acid.

2. The process according to claim 1 wherein the edible organic acid is lactic acid.

3. The process according to claim 1 wherein the edible organic acid is incorporated into the brine prior to addition of the brine to the olives.

4. The process according to claim 1 wherein the final brine acid resulting from the fermentation and computed as lactic acid, ranges about from 0.6 to 1.2 percent, on a weight/volume basis, with brine pH's varying about from 3.8 to 4.1.

5. A process for fermenting clean, sorted, and graded green olive fruit in brine comprising:
    (a) debittering the green olive fruit by soaking it in sodium hydroxide solution which is at a temperature of about from 60° F. to 70° F. and of a strength varying about from 1.25 to 2.0 weight percent, said combination of sodium hydroxide and olives being maintained at about ambient room temperature until the sodium hydroxide has penetrated about from ⅔ to ¾ of the way to the pit of the fruit,
    (b) separating the sodium hydroxide solution from the fruit followed by washing and leaching the fruit in cool water to remove the sodium hydroxide,
    (c) heat-shocking the washed olives by complete immersion in hot water maintained at about from 165° to 175° F. for about from 3 to 5 minutes to reduce the numbers of contaminating vegetative micro-organisms, and to inactivate or attenuate deleterious enzyme systems that might cause deterioration of the texture, color, flavor, and odor in the ultimately fermented product,
    (d) draining and packing the heat-shocked olives in a "sanitized" container together with a brine which has been previously heated to about from 175° F. to 180° F. and subsequently cooled to about from 40° F. to 45° F. so that the total pack consisting of the hot, heat-shocked olives, the brine, and the container, will equalize out within the temperature range of about from 92° F. to 93° F. desired for growth of the particular lactic acid organism to be chosen for the subsequent fermentation, said brine being of a strength to give a final equilibrium concentration of salt within the range of about from 4.0 to 6.5 weight percent,
    (e) adding to the container a sufficient quantity of a food-grade, edible organic acid to reduce the pH of the equalized brine to about from 5.0 to 5.5 thereby to accelerate the early onset of the fermentation of the olives, and, simultaneously, to inhibit the growth of spore-forms that survive the debittering, washing, leaching and heat-shocking treatments, (f) allowing the brined and acidified olives to stand for about from 12 to 24 hours at ambient room temperature to reduce the salt concentration to well within the range for good growth of the cultures to be used for inoculation, (g) inoculating the container of the debittered, heat-shocked, packed, brined, acidified, and cooled olives with equal quantities of the pure culture lactic acid fermentation-inducing micro-organisms *Lactobacillus plantarum* and *Pediococcus cerevisiae*, each micro-organism being introduced in a quantity the order of magnitude of which is about 1,000,000,000 viable cells per quart of packed and brined olives, (h) sealing and incubating the container of olives at a temperature favorable for the growth of the introduced pure culture micro-organisms until the fermentation has progressed to completion, as indicated by abatement of micro-organism growth and development of brine acid.

6. The process according to claim 5 wherein the final brine acid resulting from the fermentation and computed as lactic acid ranges about from 0.6 to 1.2 percent, on a weight/volume basis, with brine pH's varying about from 3.8 to 4.1.

References Cited

Cruess, Commercial Fruits and Vegetables, 3rd ed., McGraw-Hill Book Co., Inc., New York, 1948, pp. 633–637.

Etchells et al.: Pure Culture Fermentation of Brined Cucumbers, Applied Microbiology, vol. 12, November 1964, pp. 523–535.

RAYMOND N. JONES, Primary Examiner

J. M. HUNTER, Assistant Examiner

PO-1050
(5/69)

UNITED STATES PATENT OFFICE
CERTIFICATE OF CORRECTION

Patent No. 3,480,448             Dated November 25, 1969

Inventor(s) John L. Etchells, Thomas A. Bell, and Kvan D. Kittel

It is certified that error appears in the above-identified patent and that said Letters Patent are hereby corrected as shown below:

In Column 3, line 64, "leached" should be substituted for "bleached."

SIGNED AND
SEALED
JUN 23 1970

(SEAL)
Attest:

Edward M. Fletcher, Jr.
Attesting Officer

WILLIAM E. SCHUYLER, JR.
Commissioner of Patents